US010140298B2

(12) United States Patent
Albouyeh et al.

(10) Patent No.: US 10,140,298 B2
(45) Date of Patent: Nov. 27, 2018

(54) SOCIAL NETWORKING RESPONSE MANAGEMENT SYSTEM

(71) Applicant: International Business Machines Corporation, Armonk, NY (US)

(72) Inventors: Shadi E. Albouyeh, Raleigh, NC (US); Bernadette A. Carter, Raleigh, NC (US); Jeffrey R. Hoy, Southern Pines, NC (US)

(73) Assignee: International Business Machines Corporation, Armonk, NY (US)

( * ) Notice: Subject to any disclaimer, the term of this patent is extended or adjusted under 35 U.S.C. 154(b) by 208 days.

(21) Appl. No.: 14/627,491

(22) Filed: Feb. 20, 2015

(65) Prior Publication Data

US 2016/0246770 A1 Aug. 25, 2016

(51) Int. Cl.

| | |
|---|---|
| ***G06F 15/16*** | (2006.01) |
| ***G06F 17/30*** | (2006.01) |
| ***G06F 17/27*** | (2006.01) |
| ***H04L 12/58*** | (2006.01) |
| ***G06Q 30/02*** | (2012.01) |
| *G06Q 50/00* | (2012.01) |

(52) U.S. Cl.

CPC .... *G06F 17/30029* (2013.01); *G06F 17/2785* (2013.01); *G06Q 30/0269* (2013.01); *H04L 51/12* (2013.01); *H04L 51/32* (2013.01); *H04L 51/36* (2013.01); *G06Q 50/01* (2013.01)

(58) Field of Classification Search

CPC ... H04L 51/12; H04L 51/32; G06F 17/30029; G06F 17/2785; G06Q 50/01; G06Q 30/0269

See application file for complete search history.

(56) References Cited

U.S. PATENT DOCUMENTS

| | | | | |
|---|---|---|---|---|
| 7,552,178 | B2 | 6/2009 | Chen et al. | |
| 8,060,574 | B2 | 11/2011 | Evans et al. | |
| 8,782,217 | B1 * | 7/2014 | Arone | H04W 12/08 709/224 |
| 9,083,997 | B2 | 7/2015 | Harwell et al. | |
| 2011/0138298 | A1 | 6/2011 | Alfred et al. | |
| 2012/0030282 | A1 | 2/2012 | Brody et al. | |
| 2013/0275429 | A1 | 10/2013 | York et al. | |
| 2013/0332545 | A1 | 12/2013 | Primus et al. | |
| 2014/0040387 | A1 * | 2/2014 | Spivack | H04L 51/32 709/206 |
| 2014/0279674 | A1 * | 9/2014 | Michels | G06Q 30/0282 705/347 |

(Continued)

OTHER PUBLICATIONS

IBM: List of IBM Patents or Patent Applications Treated As Related (Appendix P), Mar. 22, 2016, pp. 1-2.

(Continued)

*Primary Examiner* — Philip Chea
*Assistant Examiner* — Robert B McAdams
(74) *Attorney, Agent, or Firm* — Michael A. Petrocelli

(57) ABSTRACT

A system and method for managing electronic social networking includes defining content from a first user for communication to other users on an electronic social networking system. Natural language processing (NLP) and analytic analysis are applied to the content to identify a workflow for accessing and responding to the content. The access and the response to the content are based on the workflow.

18 Claims, 2 Drawing Sheets

100

Defining content from a first user for communication to other users on an electronic social networking system. 104

Applying natural language processing (NLP) and analytic analysis to the content. 108

Identifying a workflow via a set of rules for accessing and responding to the content from the NLP and analytic analysis. 112

Controlling the access and the response to the content based on the workflow. 116

Have the rules been complied with? 120

No

Yes

Continue the workflow. 124

(56) References Cited

U.S. PATENT DOCUMENTS

| | | | | |
|---|---|---|---|---|
| 2014/0289261 | A1* | 9/2014 | Shivakumar | G06Q 10/101 707/748 |
| 2015/0026267 | A1* | 1/2015 | Chakra | H04L 51/00 709/206 |
| 2015/0370909 | A1 | 12/2015 | Volach | |
| 2017/0329843 | A1 | 11/2017 | Albouyeh et al. | |
| 2017/0330293 | A1 | 11/2017 | Albouyeh et al. | |

OTHER PUBLICATIONS

U.S. Appl. No. 15/077,043, filed Mar. 22, 2016, entitled: "Social Networking Response Management System", pp. 1-18.

IBM: List of IBM Patents or Patent Applications Treated as Related (Appendix P), Jun. 14, 2018, pp. 1-2.

* cited by examiner

SOCIAL NETWORKING RESPONSE MANAGEMENT SYSTEM

BACKGROUND

The present disclosure relates to a method and system for managing social networking on electronic social media. Collaboration among individuals and groups of individuals can be implemented online through electronic social media, including, for example, messaging, posting, sharing, and other communications. Shared content can include an indication of agreement with shared content or a shared post, or include comments, proposed edits, or counter proposals of the shared post. The shared content in a social media may also be available to all users in a specified group, to a general audience, or available to the public.

SUMMARY

According to an aspect of the present invention, a method for managing electronic social networking includes defining content from a first user for communication to other users on an electronic social networking system. Natural language processing (NLP) and analytic analysis are applied to the content to identify a workflow for accessing and responding to the content. The access and the response to the content are based on the workflow.

According to another aspect of the present invention, a computer program product manages electronic social networking. The computer program product comprises a computer readable storage medium having program instructions embodied therewith, wherein the computer readable storage medium is not a transitory signal per se. The program instructions are executable by a computer to cause the computer to perform a method. The method includes: defining content from a first user for communication to other users on an electronic social networking system; applying natural language processing (NLP) and analytic analysis to the content to identify a workflow for accessing and responding to the content; and controlling the access and the response to the content based on the workflow.

According to another aspect of the present invention, a computer system for managing electronic social networking, includes: one or more computer processors, one or more computer-readable storage media, and program instructions stored on one or more of the computer-readable storage media for execution by at least one of the one or more processors. The program instructions include: defining content from a first user for communication to other users on an electronic social networking system; applying natural language processing (NLP) and analytic analysis to the content to identify a workflow for accessing and responding to the content; and controlling the access and the response to the content based on the workflow.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
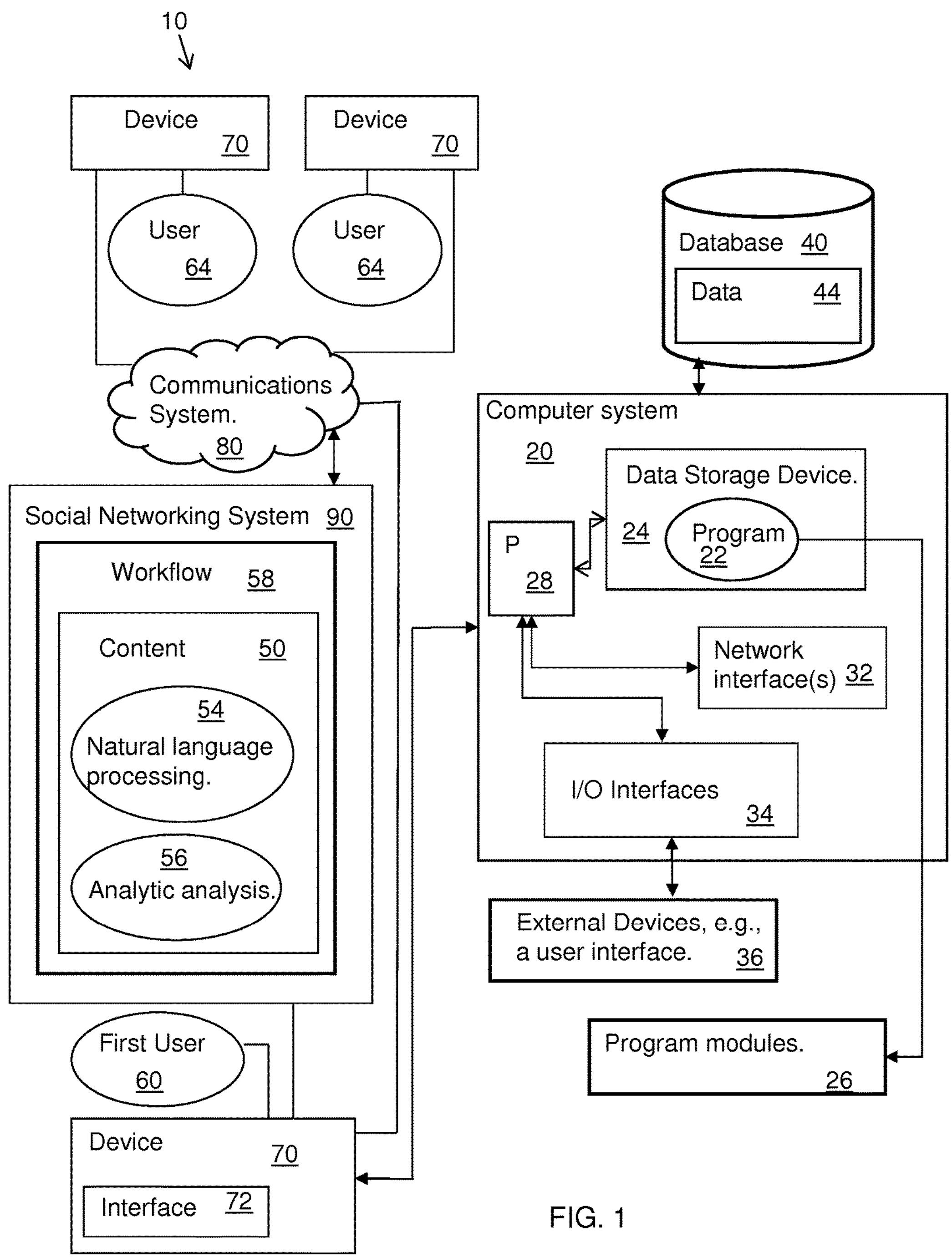
FIG. 1 is a schematic block diagram illustrating an overview of a system and methodology for managing electronic social networking according to an embodiment of the disclosure.
Figure 2:
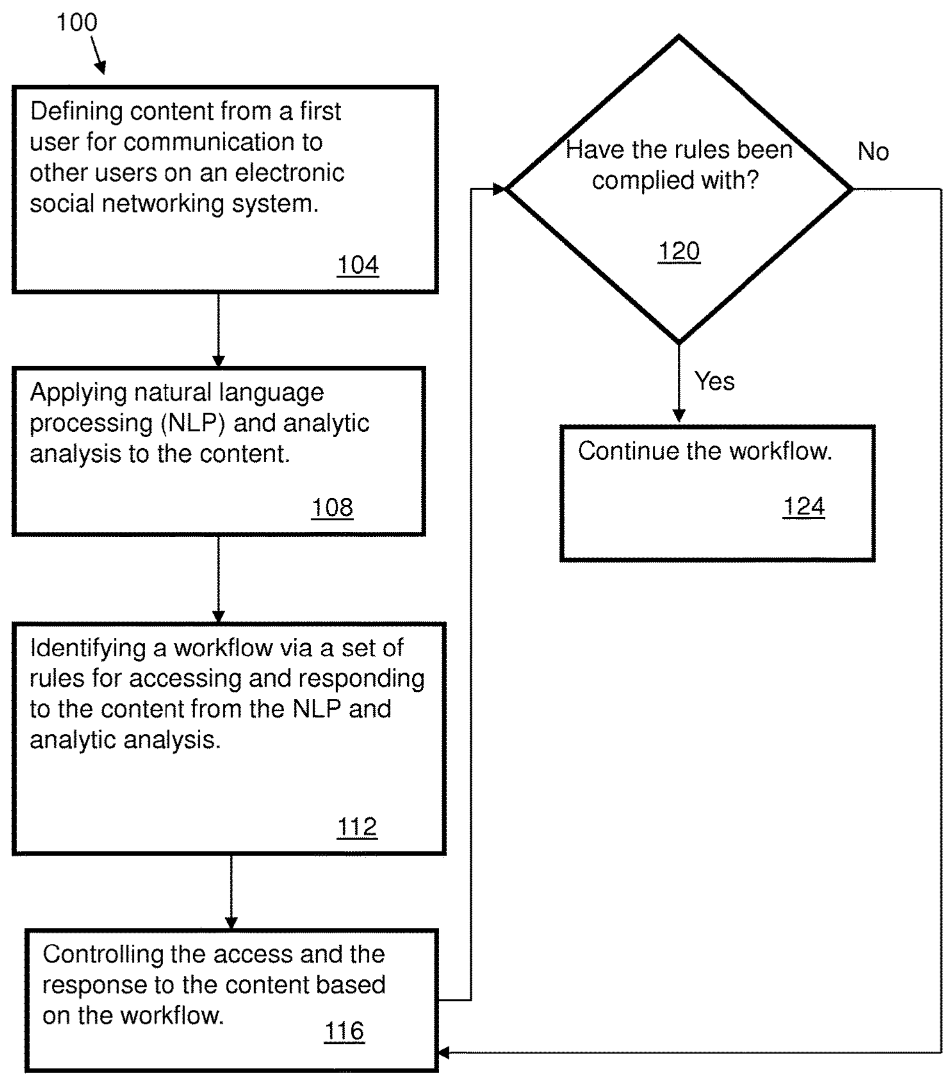
FIG. 2 is a flow chart illustrating a method for managing electronic social networking based on FIG. 1 according to an embodiment of the disclosure.

Referring to FIGS. 1 and 2, a system 10 and method 100 for managing electronic social networking is discussed. The method 100 defines content 50 from a first user 60 for communication to other users 64 on an electronic social networking system 90, as in block 104 of FIG. 2. The electronic social networking system can include one or more of, for example: a blog, a community, a news feed, or a forum.

A device 70 can be used by all the users (whether the first user 60 or other users 64) to communicate using a communications system 80 to access the social networking system 90. The devices 70 are a generic representation for a plurality of user devices, for example, a computer, a laptop, a mobile device, a Personal Data Assistant (PDA), a cell phone, a notebook, or the like. The devices 70 are configured to send and receive electronic communications. The computer 20 is a generic representation of a computer which may be embodied in a communications device such as a hand held or mobile device, or can also represent a server for providing the method as a service which can be accessible using the Internet or a network, generically represented as the communications system 80.

The social networking system 90 can be accessed on-line, for example using a network or the Internet (generically represented as the communications system 80), to use messaging such as text messaging and e-mail, and to post and access shared content. The social networking system 90 can use, for example, the communications system 80, and in one example, be hosted on a remote server or be offered as a service.

The method 100 applies natural language processing (NLP) 54 and analytic analysis 56 to the content 50 to identify a workflow 58 for accessing and responding to the content, as in blocks 108 and 112 of FIG. 2. The workflow can include a set of rules or permissions for managing how the content will be communicated and accessed. One or more users 64 can access the content 50 and respond to the content originating from the first user 60, as defined by the workflow 58. Thus, the method 100 includes controlling the access and the response to the content 50 based on the workflow 58, as in block 116.

More specifically, the analytic analysis can include analyzing information from the social networking system to identify one or more areas of interest of the users. Areas of interest can include: an activity, an expertise, work experience, a current project, a skill, or relationships between users. For example, a relationship can be defined as users belonging to an online group, or all managers, or the relationship can be those that have expressed a particular interest or users having a common interest or participating in a common activity. A rule can require users who belong to a specified group, or all managers, to review content first before sending content to others, or allowing content to be accessed by others.

Further, the workflow can control the flow of information by including a set of rules. The rules can include one or more user actions which define a level of permission for a user.

For example, the user actions can include: read only, or allow a reply. For example, the rules can allow a document to be reviewed in read only mode. The rules can also specify whether to allow a response or editing and comments. Additionally, the rules can specify a target responder, or set a sequence of responders. For example, the rules can also allow only a specified responder to comment and/or respond to the content. Further, a rule can allow only one user to replace the content, or allow a user to edit or replace content after a period of time has elapsed. In another example, a message can be communicated after a period of time has elapsed, for instance, if no user has commented about the shared content, a message can be communicated that the content will be removed for lack of response.

The workflow can include requiring a sequence of responders. For example, allowing a first user to respond, then allowing a second user to respond only after the first user has completed a response. The rules can also include a criteria for advancing the workflow to a next step, for example, inquiring if a specified user reviewed the content, and if yes, then forwarding comments to the initiating user for review. The rules can also include a time frame where, for example, after a period of time has expired, any comments are forwarded back to an initiating user for review.

Thereby, the method can determine if the rules discussed above have been complied with, as in block 120 of FIG. 2. When the rules have not been met (in block 120), the method 100 can continue controlling access based on the workflow as in block 116. When the rules have been met (in block 120), the method can continue with the workflow, as in block 124, for example, implementing the remaining rules to complete the workflow.

The method can further include allowing the first user to adjust the workflow. For example, the method and system can further provide a user interface (UI) 72 for instance on a display of a computer, such that the user interface allows a user to adjust the workflow. For example, the user can allow other users to access the content after a designated user has completed a review.

The method 100 may be embodied in a program 22 embodied on a computer readable storage device, e.g., data storage device 24. The program 22 is executable by a processor 28 of a computer system 20 (to execute program steps, code, or program code). Additional data storage may also be embodied as a database 40 including data 44. The program or executable instructions may be offered as a service by a provider. The computer 20 and program 22 shown in FIG. 1 are generic representations of a computer and program that may be local to a user, or provided as a remote service, such as a website accessible using a network (e.g., interacting with the Internet or cloud services). It is understood that the computer 20 also generically represents herein a computer device or a computer included in a device, such as a laptop or desktop computer, etc., or one or more servers, alone or as part of a datacenter. The computer system 20 can include a network interface 32, and input/output (I/O) interface(s) 34. The I/O interface 34 allows for input and output of data with an external device 36 that may be connected to the computer system. The network interface 32 may provide communications between the computer system and a computer network. The method steps and system components and techniques may be embodied in modules of the program 22 for performing the tasks of each of the steps of the method and system, which are generically represented in FIG. 1 as program modules 26. The program 22 and program modules 26 can execute specific steps, routines, sub-routines, instructions or code, of the program.

In one example, the content 50 may be sent from the device 70 from the first user 60 using the communications system 80. The communications system can be embodied, for example, as an intranet or the Internet. Content can be posted on a shared site accessible using the communications system. The post can be accessible using an internal network or a web browser accessing the post over the Web (World Wide Web). The device 70 may be a mobile smartphone capable of running the web browser which uses a communications system 80 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

In one example according to an embodiment of the present disclosure, a first user can update a customer experience on an online post of a network. The first user can require (using rules) a specified user's input before making the first user's post available for public viewing. In another example, a workflow can be implemented that routes the first user's post to one or more specified users for initial input or approval. In this example, upon receiving the input or approval of the specified user(s), the post is made publically available to all the other users. The specified users can also receive notifications that the post is available for public viewing.

Thereby, the present disclosure provides a response management system for shared content. A set of rules can be instituted for implementing access and visibility for shared content, and then the shared content can be routed and request a response to one or more users. Once the response request is completed, the content can be made public or shared with all those intended.

The workflow can be within a social network where users communicate. The communications can be limited via rules to a specified set of users and/or editing privileges such as read-only, reply permissions, or allowing responses for only one or specified users. Rules can include permission rules which can include a rule being met before permission is granted for a user to view, edit, or comment on content.

The method of the present disclosure can also automatically determine the most likely responder of a group of users, and route content to that user for a response, edit, comment, or approval, before making the content available to the rest of the users. The method of the present disclosure can also automatically determine and recommend a recipient to complete a review of content. For example, the method can use a search a specified expertise for a group of users participating in an electronic social media. The method/system can also search for specified content, or search within a group of users for common interests, activities, work experience, current projects, a skill assessment, or a work relationship.

Referring to FIG. 1, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The embodiments, features, and instructive examples described above are illustrative, and should not be construed to limit the present disclosure to the particular embodiments or enumerated examples. Thus, various changes and modifications may be effected by one skilled in the art without departing from the spirit or scope of the disclosure as defined in the appended claims.

What is claimed is:

1. A method for managing electronic social networking, comprising:

defining content from a first user for communication to other users on an electronic social networking system;

applying natural language processing (NLP) and analytic analysis to the content to identify a workflow for accessing and responding to the content by the first user and the other users;

defining a set of rules as part of the workflow for controlling access and responses to the content, the set of rules including user actions for defining a level of permission for each user of the other users in relation to the workflow;

the defining of the set of rules including identifying a plurality of areas of interest to the other users in relation to the workflow using the analytic analysis by analyzing information from the social networking system, the areas of interest including one or more of: an expertise, work experience, a current project, a skill; and controlling the access and the responding to the content by the first user and the other users based on the defined set of rules for the workflow which includes the areas of interest to the other users;

the controlling the access and the responding to the content including:

allowing a first group of one or more specified responders of the other users to respond to the content based on the defined set of rules for the workflow;

blocking a second group of one or more specified responders of the other users from responding to the content based on the defined set of rules for the workflow;

allowing a first sub-group of the first group to replace the content based on the defined set of rules for the workflow;

allowing a second sub-group of the first group to edit and/or replace the content after a period of time has elapsed, based on the defined set of rules for the workflow; and allowing the second group of the one or more specified responders of the other users to respond to the content, in response to the first group of the one or more specified responders of the other users completing a response.

2. The method of claim 1, wherein the social networking system includes one or more of: a blog, a community, a news feed, or a forum.

3. The method of claim 1, wherein the analytic analysis includes analyzing information about the users from the social networking system to identify one or more areas of commonality between the users.

4. The method of claim 3, wherein the area of commonality includes: a common interest, or a common activity.

5. The method of claim 1, wherein the analytic analysis includes analyzing information about the users from the social networking system to identify one or more areas of interest of the users.

6. The method of claim 5, wherein the areas of interest include: an activity; an expertise, work experience, a project, a skill, or a relationship.

7. The method of claim 1, wherein the rules include one or more of the following user restrictions: read only, reply, target responder, permission, sequence of responders, criteria for next step, time frame, or replacement.

8. The method of claim 1, further comprising:

allowing a user to adjust the workflow using a user interface (UI) on a display of a computer.

9. The method of claim 8, wherein the first user adjusts the workflow using the user interface (UI).

10. A computer program product for managing electronic social networking, the computer program product comprising a computer readable storage medium having program instructions embodied therewith, wherein the computer readable storage medium is not a transitory signal per se, the program instructions executable by a computer to cause the computer to perform a method, comprising:

defining, by the computer, content from a first user for communication to other users on an electronic social networking system;

applying, by the computer, natural language processing (NLP) and analytic analysis to the content to identify a workflow for accessing and responding to the content by the first user and the other users;

defining a set of rules as part of the workflow for controlling access and responses to the content, the set of rules including user actions for defining a level of permission for each user of the other users in relation to the workflow;

the defining of the set of rules including identifying a plurality of areas of interest to the other users in relation to the workflow using the analytic analysis by analyzing information from the social networking system, the areas of interest including one or more of: an expertise, work experience, a current project, a skill; and controlling, by the computer, the access and the responding to the content by the first user and the other users based on the defined set of rules for the workflow which includes the areas of interest to the other users;

the controlling the access and the responding to the content including:

allowing a first group of one or more specified responders of the other users to respond to the content based on the defined set of rules for the workflow;

blocking a second group of one or more specified responders of the other users from responding to the content based on the defined set of rules for the workflow;

allowing a first sub-group of the first group to replace the content based on the defined set of rules for the workflow;

allowing a second sub-group of the first group to edit and/or replace the content after a period of time has elapsed, based on the defined set of rules for the workflow; and allowing the second group of the one or more specified responders of the other users to respond to the content, in response to the first group of the one or more specified responders of the other users completing a response.

11. The computer program product of claim 10, wherein the social networking system includes one or more of: a blog, a community, a news feed, or a forum.

12. The computer program product of claim 10, wherein the analytic analysis includes analyzing information about the users from the social networking system to identify one or more areas of commonality between the users.

13. The computer program product of claim 12, wherein the area of commonality includes: a common interest, or a common activity.

14. The computer program product of claim 10, wherein the analytic analysis includes analyzing information about the users from the social networking system to identify one or more areas of interest of the users.

15. The computer program product of claim 14, wherein the areas of interest include: an activity; an expertise, work experience, a project, a skill, or a relationship.

16. The computer program product of claim 10, wherein the rules include one or more of the following user restrictions: read only, reply, target responder, permission, sequence of responders, criteria for next step, time frame, or replacement.

17. The computer program product of claim 10, further comprising:

allowing a user to adjust the workflow using a user interface (UI) on a display of a computer.

18. A computer system for managing electronic social networking, the computer system comprising:

one or more computer processors, one or more computer-readable storage media, and program instructions stored on one or more of the computer-readable storage media for execution by at least one of the one or more processors, the program instructions, comprising:

defining content from a first user for communication to other users on an electronic social networking system;

applying natural language processing (NLP) and analytic analysis to the content to identify a workflow for accessing and responding to the content by the first user and the other users;

defining a set of rules as part of the workflow for controlling access and responses to the content, the set of rules including user actions for defining a level of permission for each user of the other users in relation to the workflow;

the defining of the set of rules including identifying a plurality of areas of interest to the other users in relation to the workflow using the analytic analysis by analyzing information from the social networking system, the areas of interest including one or more of: an expertise, work experience, a current project, a skill; and controlling the access and the responding to the content by the first user and the other users based on the defined set of rules for the workflow which includes the areas of interest to the other users;

the controlling the access and the responding to the content including:

allowing a first group of one or more specified responders of the other users to respond to the content based on the defined set of rules for the workflow;

blocking a second group of one or more specified responders of the other users from responding to the content based on the defined set of rules for the workflow;

allowing a first sub-group of the first group to replace the content based on the defined set of rules for the workflow;

allowing a second sub-group of the first group to edit and/or replace the content after a period of time has elapsed, based on the defined set of rules for the workflow; and allowing the second group of the one or more specified responders of the other users to respond to the content, in response to the first group of the one or more specified responders of the other users completing a response.

* * * * *